(12) United States Patent
Gastaldi

(10) Patent No.: US 12,103,208 B2
(45) Date of Patent: Oct. 1, 2024

(54) PROCESS FOR MOULDING AND RELATIVE MACHINE FOR MOULDING

(71) Applicant: PERSICO S.P.A., Nembro (IT)

(72) Inventor: Sergio Battista Gastaldi, Nembro (IT)

(73) Assignee: PERSICO S.P.A. (IT)

( * ) Notice: Subject to any disclaimer, the term of this patent is extended or adjusted under 35 U.S.C. 154(b) by 172 days.

(21) Appl. No.: 17/788,753

(22) PCT Filed: Dec. 28, 2020

(86) PCT No.: PCT/IT2020/050324
§ 371 (c)(1),
(2) Date: Jun. 24, 2022

(87) PCT Pub. No.: WO2021/140532
PCT Pub. Date: Jul. 15, 2021

(65) Prior Publication Data
US 2023/0028451 A1 Jan. 26, 2023

(30) Foreign Application Priority Data
Jan. 8, 2020 (IT) ........................ 102020000000175

(51) Int. Cl.
*B29C 44/08* (2006.01)
*B29C 43/14* (2006.01)
(Continued)

(52) U.S. Cl.
CPC .............. *B29C 43/52* (2013.01); *B29C 43/18* (2013.01); *B29C 43/36* (2013.01); *B29K 2101/12* (2013.01); *B29K 2713/00* (2013.01)

(58) Field of Classification Search
CPC ..... B29C 33/048; B29C 35/04; B29C 35/049; B29C 44/3426; B29C 44/343;
(Continued)

(56) References Cited

U.S. PATENT DOCUMENTS 3,159,693 A * 12/1964 Plymale ................. B29C 44/10
220/DIG. 14
3,264,381 A * 8/1966 Stevens ................. B29C 44/445
264/45.2
(Continued)

FOREIGN PATENT DOCUMENTS

EP 0657266 B1 * 11/1994 ............. B29C 44/04

OTHER PUBLICATIONS

Eder NPL (Year: 1994).*

*Primary Examiner* — Matthew J Daniels

(57) ABSTRACT

Process and relative machine for moulding a thermoplastic material for producing a finished article having a shape, wherein the process comprises:
  providing a mould (99) comprising a first (1) and a second half-mould (2) each having a respective conformation surface (3, 4) which define, with closed mould, a cavity (5) having, in a conformation configuration, the shape;
  making a semi-finished product (70) made of the thermoplastic material;
  closing the mould (99) with the semi-finished product (70) interposed between the conformation surfaces (3, 4);
  admitting a heating fluid into the cavity (5) for heating the semi-finished product (70) permeable to the heating fluid;
  arranging the cavity (5) in a compacting configuration in which the cavity (5) coincides with a sub-portion of the cavity (5) in the conformation configuration;
  with the cavity (5) in the compacting configuration and the heating fluid into the cavity (5), compressing the semi-finished product (70) between the conformation surfaces (3, 4);
  subsequently to compressing the semi-finished product (70), arranging the cavity (5) in the conformation
(Continued)

configuration while keeping the heating fluid into the cavity (5), wherein the semi-finished product (70) elastically expands for completely occupying the cavity and assuming the shape;

subsequently, evacuating the heating fluid from the cavity (5) for cooling the semi-finished product (70) for obtaining the finished article with the shape;

opening the mould (99) and extracting the finished article from the mould (99).

7 Claims, 11 Drawing Sheets

(51) Int. Cl.
*B29C 43/18* (2006.01)
*B29C 43/36* (2006.01)
*B29C 43/52* (2006.01)
*B29K 101/12* (2006.01)

(58) Field of Classification Search
CPC ... B29C 44/3434; B29C 70/461; B29C 44/08; B29C 44/083; B29C 44/10; B29C 44/3465; B29C 44/3496
See application file for complete search history.

(56) References Cited

U.S. PATENT DOCUMENTS

| | | | | | |
|---|---|---|---|---|---|
| 3,912,430 | A | * | 10/1975 | Noel | B29C 44/58 249/161 |
| 3,941,528 | A | * | 3/1976 | Cotterell | B29C 44/3426 264/102 |
| 3,992,238 | A | * | 11/1976 | Johns | B29C 44/445 264/234 |
| 4,192,638 | A | * | 3/1980 | Lezier | B29C 44/445 249/111 |
| 5,108,691 | A | * | 4/1992 | Elliott | B29C 43/203 264/296 |
| 5,372,764 | A | * | 12/1994 | Matsuka | B29C 44/445 264/50 |
| 5,696,201 | A | * | 12/1997 | Cavalloni | B27N 3/086 264/83 |
| 5,820,894 | A | * | 10/1998 | Kreutzer | B29C 70/549 425/389 |
| 5,976,295 | A | | 11/1999 | Ang | |
| 6,103,180 | A | * | 8/2000 | Haeseker | D04H 1/4291 264/37.17 |
| 6,492,000 | B1 | * | 12/2002 | Matsuki | B29C 44/146 264/296 |
| 6,527,993 | B1 | * | 3/2003 | Hirai | B29C 44/3415 264/55 |
| 6,800,227 | B1 | * | 10/2004 | Nohara | B29C 44/445 264/126 |
| 2002/0047225 | A1 | * | 4/2002 | Bruning | B29C 44/445 264/46.4 |
| 2006/0103052 | A1 | | 5/2006 | Reetz et al. | |
| 2006/0278322 | A1 | * | 12/2006 | Piatkowski | B29C 35/049 264/122 |
| 2011/0104478 | A1 | * | 5/2011 | Simard | B29C 44/586 264/48 |
| 2012/0328847 | A1 | | 12/2012 | Buska et al. | |
| 2014/0050886 | A1 | | 2/2014 | Burgin et al. | |
| 2014/0124972 | A1 | * | 5/2014 | Burgin | B32B 15/20 264/45.3 |
| 2016/0311134 | A1 | * | 10/2016 | Reuber | B29C 44/445 |
| 2018/0290351 | A1 | * | 10/2018 | Brexeler | B29C 44/3415 |
| 2019/0344691 | A1 | | 11/2019 | Liau | |

* cited by examiner

PROCESS FOR MOULDING AND RELATIVE MACHINE FOR MOULDING

TECHNICAL FIELD OF THE INVENTION

The present invention relates to a process for moulding and a machine for moulding a thermoplastic material for the production of articles such as acoustic insulators, wadding, filters, padding, interior trims for cars, etc.

STATE OF THE ART

It is known carrying out a process for moulding wherein a semi-finished product is housed inside a mould cavity having the final shape of the article to be produced.

Once the semi-finished product has been inserted into the cavity, the mould is closed. Typically, the mould is preheated, with a heating time that goes from a few minutes up to a few hours. Subsequently, saturated or superheated steam at high pressure and high temperature is introduced into the cavity to favour the heating and the softening of the semi-finished product. The compression of the semi-finished product favours the forming of the heated semi-finished product, which assumes the shape determined by the conformation surfaces of the mould.

Once the forming of the material is finished, the saturated steam is discharged in the outer environment to obtain the cooling of the semi-finished product so to at least partially consolidate the shape assumed by the article. At this point the mould is opened and the article can be (e.g., manually and/or using appropriate extractors) extracted from the mould to complete the cooling phase.

U.S. Pat. No. 5,108,691A discloses a multilayer semi-finished product obtained by lamination.

EP1078821, CN103303214, U.S. Pat. No. 5,696,201, CN103692753, JP4919881, U.S. Pat. No. 5,976,295 and US2006278322A1 disclose a process for moulding a polymeric semi-finished product.

SUMMARY OF THE INVENTION

In the field of the production of articles such as interior trims for cars, acoustic insulation, wadding, filters, padding, or any other moulded object, it is possible using a semi-finished product, which can be made of a single thermoplastic material (such as polyester, polyamide or polyurethane) and/or made of different thermoplastic materials and/or natural materials, optionally with addition of reinforcing fibres (e.g. carbon fibres or glass fibres), and subjecting this semi-finished product to a steam (or other fluid) moulding process. The semi-finished product can be in single-layer or can have a plurality of distinct layers made of polymeric material initially separated from each other or loosely bonded to each other (e.g., by lamination and/or packing and/or needle-punching), the layers being superimposed along the direction of their own thickness.

In this context, the Applicant believes that an important aspect of the production process of these articles is the degree of mutual bond between the elements making up the semi-finished product, to give the desired structural properties to the final article. Such elements making up the semi-finished product can be in the case of both single-layer and multi-layer semi-finished product, the elements that make up the internal structure of the semi-finished product, such as for example fibres or filaments or cells. The term "fibres" also includes filaments.

According to the Applicant, during the compression of the semi-finished product into the mould, the internal elements making up the semi-finished product come into mutual contact and/or interpenetration, adhering to each other (thanks to their partially melted and/or softened state) and, following the cooling, creating a cohesive and stable structure.

The Applicant believes that the known production methods of the aforesaid articles starting from a semifinished product made of thermoplastic material, in certain operating conditions, do not allow obtaining an internal bond inside the semifinished product with the desired strength and/or reliability over time. For example, this can occur when the semi-finished product has a 'natural' thickness substantially comparable to the maximum thickness of the mould cavity (intended as the distance between the two conformation surfaces), and in particular when the conformation surfaces of the mould define a cavity having marked thickness variations.

By 'natural' thickness it is meant the maximum thickness that the semi-finished product tends to assume when subjected to conditions such that to release any internal mechanical stress (i.e., typically at high temperatures). This natural thickness can coincide with the initial thickness of the semi-finished product inserted in the mould or, for example in the case in which the semi-finished product undergoes a lamination (as described below), the natural thickness corresponds approximately to (e.g., is equal to 90%-95% of the) thickness of the semi-finished product before it undergoes the lamination process. In this last case, the initial thickness of the semi-finished product inserted in the mould is significantly lower than the natural thickness and, when the semi-finished product is subjected to heating in the mould, the semi-finished product tends to recover its natural thickness (in whole or, more typically, in part, for example 90%-95% of the initial thickness, since part of the semi-finished product can remain compacted due to the own weight of the semi-finished product, and/or due to an excess of lamination and/or moulding temperature).

When the natural thickness of the semi-finished product is substantially comparable to the maximum thickness of the mould cavity, the semi-finished product during the process for moulding undergoes a weak compression (crushing), which may not be sufficient to sufficiently bring close and/or interpenetrate to each other the elements making up the semi-finished product to obtain the desired bond. The internal bond thus obtained can therefore not be very strong and/or reliable over time. For example, the Applicant has observed that in the case of a multilayer semi-finished product, the multiple distinct layers of which the semi-finished product is made and which are initially weakly or not at all bonded to each other, may be poorly adhered to each other and may separate from each other at the interfaces. According to the Applicant, this is due to insufficient mutual interpenetration at the interface between two contiguous layers.

The Applicant has also observed that the aforesaid problem of insufficient internal bond inside the semi-finished product can occur in particular when the cavity shows marked thickness variations.

In fact, the thickness of the semi-finished product is typically constant (for example, in the case of a multilayer semi-finished product, this is typically made by overlapping the thermoplastic material layers with constant thickness), while the thickness of the mould cavity can vary depending on the shape to be conferred to the article. In this situation, the semi-finished product undergoes a non-uniform internal compression when the mould is closed, due to the different thickness between the cavity areas. Therefore, in the areas where the semi-finished product has a natural thickness much greater than the thickness of the cavity, once the mould is closed, the semi-finished product is sufficiently compressed to obtain the desired internal bond. On the other hand, in the areas in which the natural thickness is comparable to (e.g., equal or only slightly greater than) the thickness of the cavity, the aforesaid phenomenon of insufficient crushing can occur with consequent insufficient bond between the elements making up the semi-finished product. An attempt to obviate this insufficient compression by increasing the natural thickness of the semi-finished product (e.g., by increasing the mass of material), could disadvantageously produce an unacceptable increase of the density of the semi-finished product, in particular in the areas with lower thickness.

The Applicant has therefore faced the problem of moulding a thermoplastic material so to confer the desired structural properties to the finished article, in terms of internal cohesion and/or strength and/or stability, even in presence of strong thickness variations in the finished article.

According to the Applicant, the above problem is solved by a process for moulding and a machine for moulding a thermoplastic material according to the attached claims and/or having one or more of the following features.

According to an aspect the invention relates to a process for moulding a thermoplastic material for producing a finished article having a shape. The process comprises:

- providing a mould comprising a first and a second half-mould each having a respective conformation surface which define, with closed mould, a cavity having, in a conformation configuration, said shape;
- making a semi-finished product made of said thermoplastic material;
- closing said mould with said semi-finished product interposed between said conformation surfaces;
- admitting a heating fluid into said cavity for heating said semi-finished product permeable to said heating fluid;
- arranging said cavity in a compacting configuration in which said cavity coincides with a sub-portion of said cavity in the conformation configuration;
- with said cavity in the compacting configuration and with said heating fluid into said cavity, compressing said semi-finished product between said conformation surfaces;
- subsequently to said compressing said semi-finished product, arranging said cavity in the conformation configuration while keeping said heating fluid into said cavity, wherein said semi-finished product elastically expands for completely occupying said cavity and assuming said shape;
- subsequently, evacuating said heating fluid from said cavity for cooling said semi-finished product for obtaining said finished article with said shape;
- opening said mould and extracting said finished article from said mould.

According to an aspect the invention relates to a machine for moulding a thermoplastic material.

The machine comprises:

- a mould comprising a first and a second half-mould each having a respective conformation surface which define, with closed mould, a cavity having, in a conformation configuration, a shape;
- an opening/closing system of said mould.

Preferably said mould comprises:

- at least one inlet conduit for a heating fluid, wherein an end of said inlet conduit (directly) faces onto said cavity and
- at least one outlet conduit for said heating fluid, wherein an end of said outlet conduit (directly) faces onto said cavity.

Preferably said conformation surface of said first half-mould comprises at least one surface portion movable between a conformation position at which said cavity is in said conformation configuration and a compacting position at which said cavity is in a compacting configuration in which said surface portion is closer to said conformation surface of said second half-mould with respect to said conformation position.

According to the Applicant, compressing the semi-finished product (in presence of the heating fluid) in the cavity arranged in the compacting configuration in which the cavity coincides with a sub-portion of the cavity in the conformation configuration (given the presence of at least a portion of the conformation surface of the first half-mould movable between a conformation position and a compacting position in which the surface portion is closer to the conformation surface of the second half-mould) allows strongly and reliably internally bonding the semi-finished product.

In fact, the aforesaid feature allows compressing the semi-finished product to a greater extent than that which would be given by the final shape of the article (corresponding to the cavity in the conformation configuration), with consequent greater mutual approach and/or contact and/or interpenetration of the elements making up the semi-finished product, for example fibres, filaments, cells, etc. In the case of a multilayer semi-finished product, for example, the interface surfaces of the distinct layers are pushed against each other to a greater extent, with a consequent increase in the mutual interpenetration degree and, therefore, in the number of fibres or cells that bind to each other at the interfaces. This greater approach/contact/interpenetration favours the adhesion between the elements making up the semi-finished product, which are in a partial melting and/or softening state due to the conditions inside the cavity, adhesion which is kept during the hot expansion of the material towards the final shape (i.e., the cavity in the conformation configuration). After the cooling, this adhesion between the fibres and cells (and therefore possibly between the faces of the layers) is stabilized.

In this way, the internal structure of the semi-finished product is cohesive, improving the structural properties of the finished article.

By arranging the cavity in the conformation configuration, in which the, still hot, semi-finished product can elastically expand to completely occupy the cavity, it is possible forming the semi-finished product so as to confer the desired shape to the finished article, which is also stabilized following the cooling of the material. This is possible because the profile of the cavity counter-shaped to the desired shape is recreated, avoiding the generation of imperfections and/or defects on the finished article.

The Applicant has also experimentally noted that the movable surface portion involves an improvement of the surface of the final product, in terms of uniformity and/or smoothness, with respect to what would have been obtained with the mould without movable surface portion. According to the Applicant, this may be due to a compaction of the areas of the semi-finished product immediately adjacent to the movable surface portion, greater than what would have been obtained by the compression with the mould in the conformation configuration only.

The present invention in one or more of the aforesaid aspects can have one or more of the following preferred features.

By "compression direction" it is meant a moving direction of said at least one surface portion and by "closing direction" it is meant a relative moving direction between the first and second half-mould during the opening and closing of the mould. These closing and compression directions are typically parallel.

Preferably the process for moulding comprises providing the machine for moulding according to the present invention.

Preferably arranging said cavity in said compacting configuration comprises positioning said at least one surface portion in said compacting position. In this way, it is possible temporarily reducing the thickness of the cavity.

Preferably arranging said cavity in said conformation configuration comprises moving said at least one surface portion from said compacting position to said conformation position. In this way the profile of the cavity is re-created for allowing the expansion of the semi-finished product and letting the semi-finished product to take the intended shape.

In one embodiment said at least one surface portion coincides with said conformation surface of said first half-mould. In other words, the entire conformation surface of the first half-mould is movable, improving the internal cohesion of the article, for example even for natural thickness only a little bit bigger than the thickness of the finished article.

In one embodiment said at least one surface portion has an extension less than or equal to 80%, more preferably less than or equal to 70%, even more preferably less than or equal to 60%, of an entire extension of said conformation surface of the first half-mould. This embodiment is particularly suitable for marked variation of the cavity thickness, as explained above.

Preferably said at least one surface portion, when said cavity is in said conformation configuration, has a distance (e.g., a maximum distance) from the conformation surface of the second half-mould greater than or equal to 50%, more preferably greater than or equal to 70%, even more preferably greater than or equal to 90%, of a natural thickness of said semi-finished product (and typically less than or equal to said natural thickness). In this way it is possible compressing with the movable surface the semi-finished product at the zones of the cavity having higher thickness, wherein it can verify that such cavity thickness is comparable to the natural thickness of the semi-finished product, so that to uniformly, strongly and long-lasting internally bond the semi-finished product.

Preferably said at least one surface portion, when said cavity is in said compacting configuration, has a distance (e.g. a maximum distance) from the conformation surface of the second half-mould less than or equal to 50%, more preferably less than or equal to 40%, even more preferably less than or equal to 30%, of a distance (e.g. a maximum distance) of the at least one surface portion from the conformation surface of the second half-mould when said cavity is in said conformation configuration. In this way, it is possible compressing the semi-finished product with the movable surface with a significantly higher compression than the one given by the mould in the conformation configuration, so that uniformly, strongly and long-lasting internally bonding the semi-finished product.

In one embodiment even said conformation surface of said second half-mould comprises at least one respective surface portion movable between a respective conformation position and a respective compacting position. Preferably said at least one respective surface portion has at least one of, more preferably all, the features of said surface portion.

In this way it is possible carrying out the compression of the semi-finished product at both the conformation surfaces.

In one embodiment said admitting said heating fluid into said cavity is carried out previously to said arranging said cavity in said compacting configuration.

In one embodiment said admitting said heating fluid into said cavity is carried out subsequently to said arranging said cavity in said compacting configuration.

Preferably said admitting said heating fluid is carried out by at least one inlet conduit.

Preferably each of said first and second half-mould comprises at least one respective inlet conduit for said heating fluid, wherein an end of each respective inlet conduit (directly) faces onto said cavity.

In this way it is possible admitting the heating fluid inside the cavity at both the cavity ends, obtaining a uniform and fast filling of the cavity.

In one embodiment at least one further inlet conduit for said heating fluid is placed at said at least one surface portion, wherein an end of said further inlet conduit (directly) faces onto said cavity.

In one embodiment said admitting said heating fluid is carried out also through said at least one further inlet conduit.

Preferably said heating fluid is admitted at a temperature greater than or equal to 100° C., more preferably greater than or equal to 120° C., even more preferably greater than or equal to 140° C., and/or less than or equal to 300° C., more preferably less than or equal to 250° C.

Preferably said heating fluid is admitted at a pressure greater than or equal to 1 bar, more preferably greater than or equal to 3 bar, even more preferably greater than or equal to 5 bar, and/or less than or equal to 20 bar, more preferably less than or equal to 15 bar.

In this it is possible rapidly and/or uniformly partially softening or melting the semi-finished product for obtaining, together with the compression of the semi-finished product, the intended internal bond of the semi-finished product.

Preferably said heating fluid is kept into said cavity for an overall time interval greater than or equal to 2 s, more preferably greater than or equal to 3 s, and/or less than or equal to 90 s, more preferably less than or equal to 60 s, even more preferably less than or equal to 30 s.

In one embodiment said heating fluid is steam, more preferably aqueous steam more preferably saturated or overheated steam. The use of steam, in particular of saturated or overheated steam, allows strongly reducing the cycle times of the process for moulding with respect to processes which use hot-air oven, adapting them to times required by industrial processes.

In one embodiment said heating fluid is overheated air. In this way the heating of the semi-finished product inside the mould is simply made.

Preferably said evacuating said heating fluid is carried out by at least one outlet conduit.

Preferably each of said first and second half-mould comprises at least one respective outlet conduit for said heating fluid, wherein an end of each respective outlet conduit (directly) faces onto said cavity.

In this way it is possible evacuating the heating fluid at both the cavity ends so that to obtain a fast emptying of the cavity.

Preferably said evacuating said heating fluid is carried out in a time interval greater than or equal to 2 s, and/or less than or equal to 30 s. In this way, it is possible quickly and efficiently cooling the semi-finished product.

Preferably said evacuating said heating fluid comprises connecting said cavity with an outside environment of said mould. In this way it is possible quickly cooling the semi-finished product and fixing the shape of the finished article. Furthermore, in case the heating fluid is saturated steam, the cooling of the semi-finished product is due both to the extraction of hot saturated steam from the cavity and to the evaporation of the steam condensed on the surface of the article, which absorbs heat from the hot semi-finished product to evaporate. The evaporation is linked to the sudden pressure decrease of the cavity, which passes from the forming pressure to the atmospheric pressure in short time, and to the more gradual temperature decrease which leads to the loss of the balance necessary for keeping the saturated steam condition. In addition, the evaporation of the saturated steam also allows the drying of the formed article.

Preferably it is provided heating said first and second half-mould, more preferably before said closing of said mould (and in any case before admitting the heating fluid). Preferably said first and second half-moulds are heated to a temperature greater than or equal to 100° C., more preferably greater than or equal to 120° C. and/or less than or equal to 340° C., more preferably less than or equal to 320° C.

Preferably said heating said first and second half-moulds comprises heating said conformation surfaces to a temperature greater than or equal to a temperature at which said heating fluid is admitted in the cavity. In this way any cooling of the semi-finished product at the areas of the semi-finished product in contact with the conformation surfaces of the half-moulds is avoided.

Preferably the machine for moulding comprises a heating system for said first and second half-moulds.

Preferably said heating said first and second half-mould comprises flowing a heating medium along a respective passage conduit for said heating medium.

Preferably said heating system of said first and second half-mould comprises at least one respective passage conduit for a heating medium at each of said first and second half-mould.

Preferably said at least one respective passage conduit (substantially) entirely passes through said first and second half-mould.

In this way it is possible easily heating both the half-moulds.

In one embodiment, in which said heating fluid is saturated steam, said heating said first and second half-mould comprises heating said conformation surfaces to a temperature greater than or equal to a temperature at which said saturated steam is admitted in said cavity. In this way, it is avoided that saturated steam can condense on the conformation surfaces of the half-moulds with consequent cooling and wetting of the semi-finished product.

Preferably said heating medium is a heat transfer fluid, more preferably diathermic oil.

In one embodiment, said heating medium is electric energy and said passage conduit is an electric resistor.

Preferably said heating medium flows inside each passage conduit at a temperature greater than or equal to 140° C., more preferably greater than or equal to 160° C.

Preferably said thermoplastic material is selected in the group: polyester, polyurethane, polyethylene, polypropylene and polyamide, more preferably it is polyester, even more preferably it is PET (poly-ethylene-terephthalate), PBT (poly-butylene-terephthalate), PTT (poly-trimethylene terephthalate).

Typically, said semi-finished product, before said closing the mould, has a (substantially) constant thickness along said moving direction (to facilitate the production process of the semi-finished product).

In one embodiment, said semi-finished product comprises a plurality of layers distinct from each other and superimposed along said moving direction, more preferably having the same structure and/or the same thickness and/or made of the same thermoplastic material. Preferably said plurality of layers is greater than or equal to 3, more preferably greater than or equal to 4, and/or less than or equal to 20, more preferably less than or equal to 10.

In this way it is possible to give the intended density and/or thickness to the finished article.

In one embodiment said semi-finished product consists of a single (homogeneous) layer.

In one embodiment said semi-finished product (more preferably each layer of said semi-finished product) has a cell structure, preferably with open cells, for example it is a solid and elastic foam (e.g., a thermoplastic foam).

Preferably said semi-finished product (more preferably each layer of said semi-finished product) comprises, or consists of, fibres, more preferably textile fibres, made of said thermoplastic material.

In one embodiment said semi-finished product comprises structural fibres and bonding fibres (e.g., fibres with low melting point, which can be the structural fibres themselves) and/or polymeric binders. In this way, the internal bond of the elements making up the semi-finished product is facilitated.

Preferably said semi-finished product (more preferably each layer of said semi-finished product) comprises, or consists of, a non-woven fabric. In this way the semi-finished product is particularly suitable for the present process for moulding.

In one embodiment said non-woven fabric comprises, or consists of, needle-punching fibres.

Preferably making said non-woven fabric comprises:
spreading superimposed to each other one or more layers of fibres (e.g., staple fibres or filaments) of thermoplastic material;
perforating (e.g., through needles having protrusions) said one or more layers of fibres along a thickness (for entangling said fibres of thermoplastic material).

In this way the fibres entrained by the movement of the needles are entangled with each other, consequently obtaining a cohesive non-woven fabric.

In one embodiment said semi-finished product (more preferably each layer of said semi-finished product) comprises a vertically lapped non-woven fabric.

Preferably said vertically lapped non-woven fabric has a 'vertical' direction along a thickness, which coincides with the main orientation direction of the laps and, typically, of the fibres that make up the laps. Preferably, such vertical direction is arranged parallel to said moving direction and/or to said closing direction of the mould.

Preferably, as for example in case of vertically lapped non-woven fabric, said semi-finished product (more preferably each layer of said semi-finished product) comprises a sheet of fibres having a plurality of laps oriented so that each lap develops from the conformation surface of the first half-mould to the conformation surface of the second half-mould. In this way, marked elastic expansion properties of the semi-finished product are advantageously obtained along the moving direction and/or the closing direction of the mould, to allow both said compression (and the consequent internal bond of the semi-finished product) and said elastic expansion for completely occupying the mould cavity. In fact, without wanting to restrict to any theory, the compression of the semi-finished product generates a stress state inside the semi-finished product which tends to bring the elements making up the semi-finished product close together (as the compression occurs along the main orientation direction of the laps of the sheet) favouring the internal bond of the semi-finished product. When, subsequently, the surface portion moves from the compacting position to the conformation position, the stress state present in the semi-finished product, due to the surface portion in the compacting position, ends and the semi-finished product elastically expands occupying the entire volume of the cavity by exploiting the elastic return effect given by the arrangement of the laps which behave like springs. In addition, this structure gives the desired properties to the final article, for example in terms of sound-absorbing capacity, damping capacity, filtering capacity, etc.

Preferably, as for example in case of vertically lapped non-woven fabric, said sheet of fibres is continuous and repeatedly folded on itself to give a trend of peaks and valleys to said plurality of laps (e.g., the sheet has a continuous forward and backward trend between the two conformation surfaces). In this way each lap constitutes an ascending or descending tract of the trend of peaks and valleys, with improvements in terms of internal cohesion and elastic behaviour.

Preferably, as for example in case of vertically lapped non-woven fabric, said fibres of said sheet are mainly (e.g., at least 60% of the fibres, more preferably at least 70% of the total fibres) concordantly oriented with a trend of said laps from the conformation surface of the first half-mould to the conformation surface of the second half-mould. In this way the elastic behaviour along the moving direction is further accentuated.

Preferably, as for example in case of vertically lapped non-woven fabric, making said semi-finished product (or each layer of said semi-finished product) comprises:
  spreading a sheet made of thermoplastic structural fibres (preferably staple fibres, for example PET fibres) and polymeric bonding fibres (which can be the structural fibres themselves and/or further fibres dedicated to the function), e.g., weakly bonded together (e.g., moderately entangled together) or even strongly bonded together (e.g., needle-punched);
  processing (e.g., carding) said sheet so as to mainly (i.e., at least 60% of the fibres) orient at least said structural fibres with respective main development directions substantially (e.g., within an angle of ±45° parallel to each other and parallel to a development line of the sheet;
  repeatedly and alternately folding said sheet of fibres moving along said development line of the sheet so as to obtain a plurality of laps with a continuous trend of peaks and valleys (e.g., the sheet assumes an accordion-like shape wherein said development line of the sheet has a coil-like trend);
  subsequently to said folding, heating (e.g., by an oven) said fibres for melting said bonding fibres and thermally bonding said fibres;
  subsequently, cooling said fibres for obtaining said semi-finished product.

In this way it is possible to create a vertically lapped non-woven fabric having a stabilized structure (thermal bond) and with the desired compression resilience properties (e.g., capacity to recover the shape following compressive stresses) along the 'vertical' direction, i.e., the direction of the thickness of the fabric. The resulting semi-finished product (or each layer of said semi-finished product) has a greater thickness than the initial sheet of fibres.

Preferably, subsequently to said folding and previously to said heating, it is provided mechanically entangling (preferably by needle-punching) said plurality of laps of the folded sheet. In this way it is possible to further stabilize the structure assumed by the fibres.

In one embodiment said semi-finished product is laminated. Preferably making said laminated semi-finished product comprises:
  spreading superimposed to each other one or more precursor layers (e.g., vertically lapped non-woven fabric), each layer having an initial thickness (i.e., the natural thickness) along a vertical direction;
  heating (e.g., by an oven) said one or more precursor layers to a temperature greater than or equal to a melting temperature of said thermoplastic material (for softening said thermoplastic material);
  compressing along said vertical direction and (preferably simultaneously) cooling (e.g., with plates kept at room temperature) said one or more precursor layers for obtaining said semi-finished product in which each layer has a thickness less than said initial thickness.

In this way it is possible reducing the encumbrance of the semi-finished product during, for example, the transport or the storage in the warehouse.

Preferably said laminated semi-finished product is interposed between said conformation surfaces with said vertical direction parallel to said moving direction and/or to said closing direction of the mould.

Preferably compressing said laminated semi-finished product between said conformation surfaces occurs due to an expansion of said laminated semi-finished product along said vertical direction. In particular, the expansion of the semi-finished product is due to the release of the mechanical stresses induced in the laminated semi-finished product during the lamination process described above in which the compression of the semi-finished product introduces a deformation of the semi-finished product and the (simultaneous) cooling of the semi-finished product causes the 'freezing' of the structure with a thickness less than the natural thickness of the semi-finished product. The stresses induced in the semi-finished product are released inside the cavity following the softening of the semi-finished product (due to the admission of the heating fluid) which involves the attempt by the semi-finished product to recover its initial or natural thickness. However, the cavity in the compacting configuration has a thickness less than the natural thickness to which the semi-finished product tends to return, which generates a force on the semi-finished product which leads to its compression.

DETAILED DESCRIPTION OF SOME EMBODIMENTS OF THE INVENTION

Figure 1:
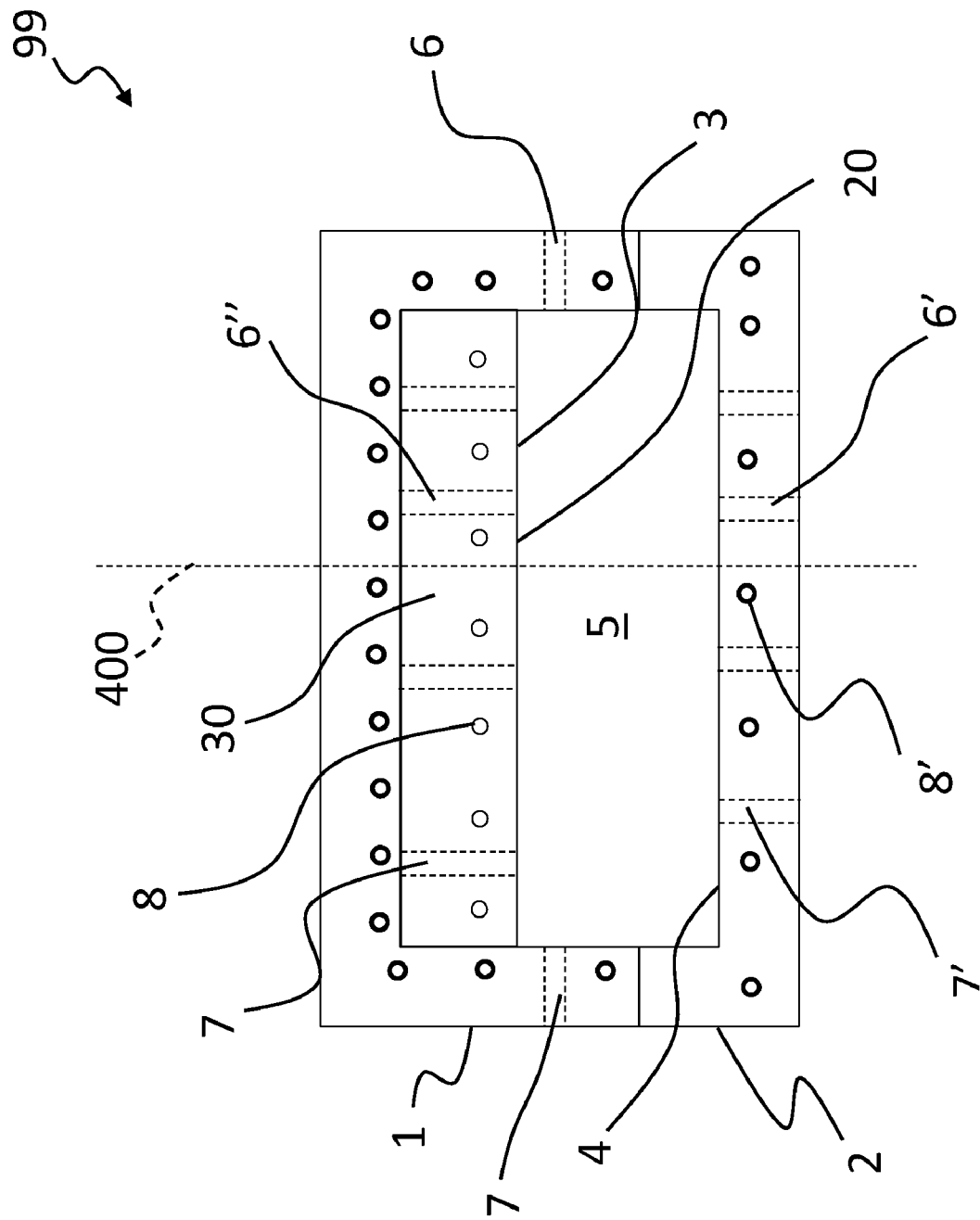
FIG. 1 schematically shows in section a mould of a machine for moulding according to an embodiment of the present invention.

The features and advantages of the present invention will be further clarified by the following detailed description of some embodiments, presented by way of non-limiting example of the present invention, with reference to the attached figures.

In the figures, the number 99 exemplarily indicates a mould of a machine for moulding a thermoplastic material which can be used for example for the moulding of articles such as interior trims for cars, seat padding, backrests, armrests, headrests, etc., sound-absorbing panels, wadding, etc.

The machine for moulding in addition to the mould 99 comprises a frame and further systems and devices functional to the moulding, such as for example an opening/closing system of the mould 99 and systems for supplying the heating fluid and the heating medium, which are not shown as for example they can be of known type.

The mould 99 comprises a first 1 and a second half-mould 2 each having a respective conformation surface 3, 4 which define, with closed mould 99, a cavity 5 having, in a conformation configuration, a shape.

Preferably the conformation surface 3 of the first half-mould 1 comprises at least one surface portion 20 (exemplarily only one) movable between a conformation position (shown for example in FIGS. 2d and 3d) at which the cavity 5 is in the conformation configuration, and a compacting position (shown for example in FIGS. 2c and 3c) at which the cavity 5 is in a compacting configuration in which the surface portion 20 is closer to the conformation surface 4 of the second half-mould 2 with respect to the conformation position. Therefore, in the compacting configuration the cavity 5 coincides with a sub-portion, or in other words is smaller, than the cavity in the conformation configuration.

Typically, the first half-mould comprises a movable element 30 having a surface facing the second half-mould 2. This surface of the movable element 30 defines the surface portion 20 movable along a moving direction indicated by the reference number 400 which coincides with a compression direction of the thermoplastic material when positioned inside the mould 99. Typically, this direction is parallel to a direction of relative movement between the first 1 and second half-mould 2 during the opening and closing of the mould 99. The first half-mould also comprises movement members for moving the movable element (e.g., an electric, mechanical or pneumatic piston, or an electric linear actuator), not further shown or described as for example known per se.

With reference to the embodiment shown in FIG. 1 (for example used to carry out the exemplar process schematically shown in FIGS. 2a-e) the surface portion 20 coincides with the entire conformation surface 3 of the first half-mould 1 (i.e., the entire conformation surface of the first half-mould is movable).

In one alternative embodiment (for example as the one schematically shown in FIGS. 3a-e) the surface portion 20 has an extension equal to about 25% of the entire extension of the conformation surface 3 of the first half-mould 1.

In one not shown embodiment, also the conformation surface 4 of the second half-mould 2 comprises a respective surface portion movable between a respective conformation position and a respective compacting position, similarly to the movable surface portion 20.

Exemplarily each half-mould 1 and 2 comprises a respective plurality of inlet conduits 6 and 6' for a heating fluid, wherein one end of each inlet conduit 6 and 6' directly faces onto the cavity 5, and a respective plurality of outlet conduits 7, 7' for the heating fluid, wherein one end of each outlet conduit 7, 7' directly faces onto the cavity 5.

Exemplarily at least one further inlet conduit 6" for the heating fluid is placed at the surface portion 20 (and passes through the movable element 30), wherein one end of the further inlet duct 6" directly faces onto the cavity 5.

Exemplarily the machine for moulding 100 comprises a heating system of the first 1 and of the second half-mould 2 comprising a plurality of respective passage conduit 8, 8' for a heating medium at each half-mould.

Exemplarily the passage conduit 8, 8' passes through the entire body of the respective half-mould (e.g., in the direction perpendicular to the figures plane).

Exemplarily the passage conduit 8, 8' are channels for letting flow diathermic oil.

In one alternative embodiment, the heating medium is electric power and the passage conduit is an electric resistor.

With reference to FIGS. 2a-e and 3a-e, two examples of a process for molding a thermoplastic material for producing a finished article having a shape are shown respectively.

The process for moulding comprises making a semi-finished product 70 made of the thermoplastic material.

Exemplarily the thermoplastic material is polyester, exemplarily PET.

Exemplarily the semi-finished product 70 comprises a plurality of layers (exemplarily three layers) distinct from each other and superimposed along the moving direction 400. Exemplarily the layers are equal to each other (they have the same structure; the same thickness and they are made of the same thermoplastic material).

In the exemplarily shown embodiments, the layers have all constant thickness and density, so that the semi-finished product has a constant thickness and a constant density for all the extension of the conformation surfaces.

In one not shown embodiment, the semi-finished product can have a not constant thickness, for example it can include one or more layers of thermoplastic material (e.g., with the same density) with a smaller extension than the entire extension of the conformation surface, so as to make areas of the semi-finished product with greater thickness, in particular at areas of the cavity in which, regardless of the thickness of the cavity, a greater density of the finished article is desired. This can occur, for example, when the shape of the finished article is particularly complex and adjustments to the amount of material inside the mould cavity are appropriate to obtain the final article with the desired aesthetic and/or structural characteristics.

In one alternative not shown embodiment, the semi-finished product consists of a single layer.

Exemplarily each layer of the semi-finished product 70 comprises a vertically lapped non-woven fabric, for example made using the machinery marketed by V-Lap Pty Ltd (see for example US2008155787A1) or by Struto International, Inc. or the process described in U.S. Pat. No. 8,357,256B2. Examples of vertically lapped non-woven fabrics are described in US2019/0248103A1.

Exemplarily each layer of the semi-finished product 70 comprises a continuous sheet of fibres (initially typically loosely bound to each other) which is repeatedly folded on itself to form a plurality of laps 50 with an overall trend of peaks and valleys (as schematically shown in the figures). In this way the vertically lapped non-woven fabric has a vertical direction along the thickness which coincides with the main orientation direction of the laps 50.

Exemplarily also the fibres of the sheet are mainly oriented along the vertical direction.

With reference to the embodiment shown in FIGS. 2*a*-*e*, the semi-finished product 70 is laminated.

Exemplarily making the laminated semi-finished product 70 comprises (not shown):
- spreading superimposed to each other a plurality of layers of vertically lapped non-woven fabric, each layer having an initial thickness (i.e., the natural thickness of the layer) along the vertical direction;
- by an oven, heating the layers to a temperature greater than the melting temperature of the thermoplastic material;
- with plates kept at room temperature, compressing along the vertical direction and cooling the layers for obtaining the laminated semi-finished product 70, in which each layer has a thickness less than the initial thickness. In other words, the thickness h of the semi-finished product 70 at the end of the lamination process is less than the initial thickness H of the semi-finished product substantially given by the sum of the initial thicknesses of each layer.

With reference to the embodiment shown in FIGS. 3*a*-*e*, the semi-finished product 70 is not laminated and before the moulding it has the natural thickness H (sum of the natural thickness of the layers that made it).

The semi-finished product is placed in the open mould 99 (FIGS. 2*a* and 3*a*) with the vertical direction (i.e., the direction of the thickness of the vertically lapped non-woven fabric) parallelly arranged to the moving direction 400. In this way the laps 50 (and typically also the greater part of the fibres) are oriented so as to develop from the conformation surface 3 of the first half-mould 1 to the conformation surface 4 of the second half-mould 2.

Exemplarily it is provided pre-heating the first 1 and the second half-mould 2 by the heating medium, exemplarily diathermic oil, at a temperature equal to about 170° C.

At this point the mould 99 is closed with the semi-finished product 70 interposed between the conformation surfaces 3, 4 (FIGS. 2*b* and 3*b*) and the heating fluid (e.g., saturated steam) is admitted in the cavity 5 through the inlet conduits 6, 6' and 6" for heating the semi-finished product 70 which is permeable to the heating fluid.

Exemplarily the saturated steam is admitted at a temperature equal to about 160° C., therefore the conformation surfaces 3, 4 are heated at a temperature greater than the temperature at which the saturated steam is admitted in the cavity 5.

Exemplarily the saturated steam is admitted at a pressure equal to about 6 bar.

The cavity 5 is arranged in the compacting configuration (FIGS. 2*c* and 3*c*), subsequently to, or (preferably) previously to, the admission of the heating fluid.

Figure 2A:
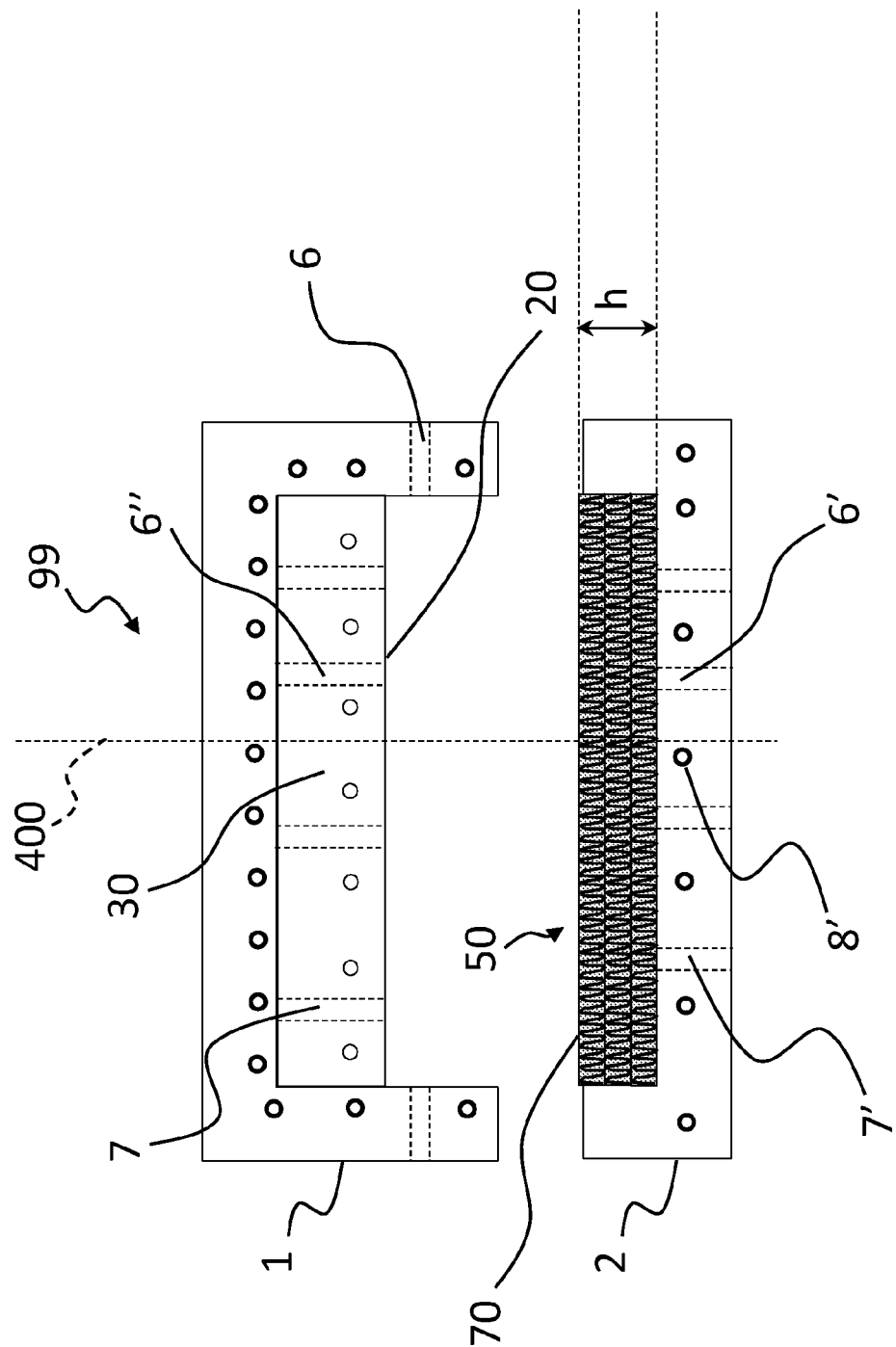
FIGS. 2a-e schematically show some steps of a process for moulding carried out with the mould of FIG. 1 according to an embodiment of the present invention.
Figure 2B:
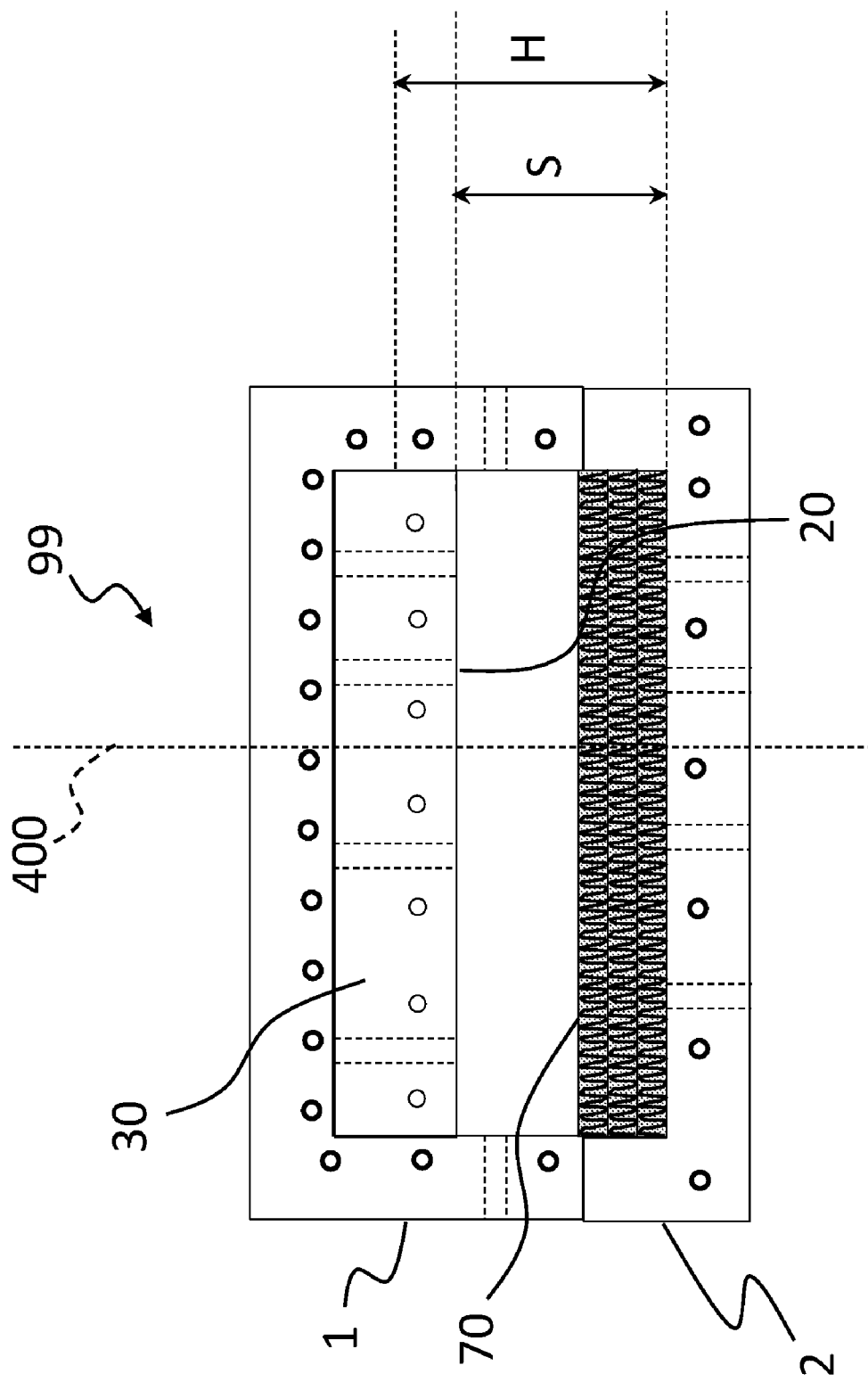
Figure 2C:
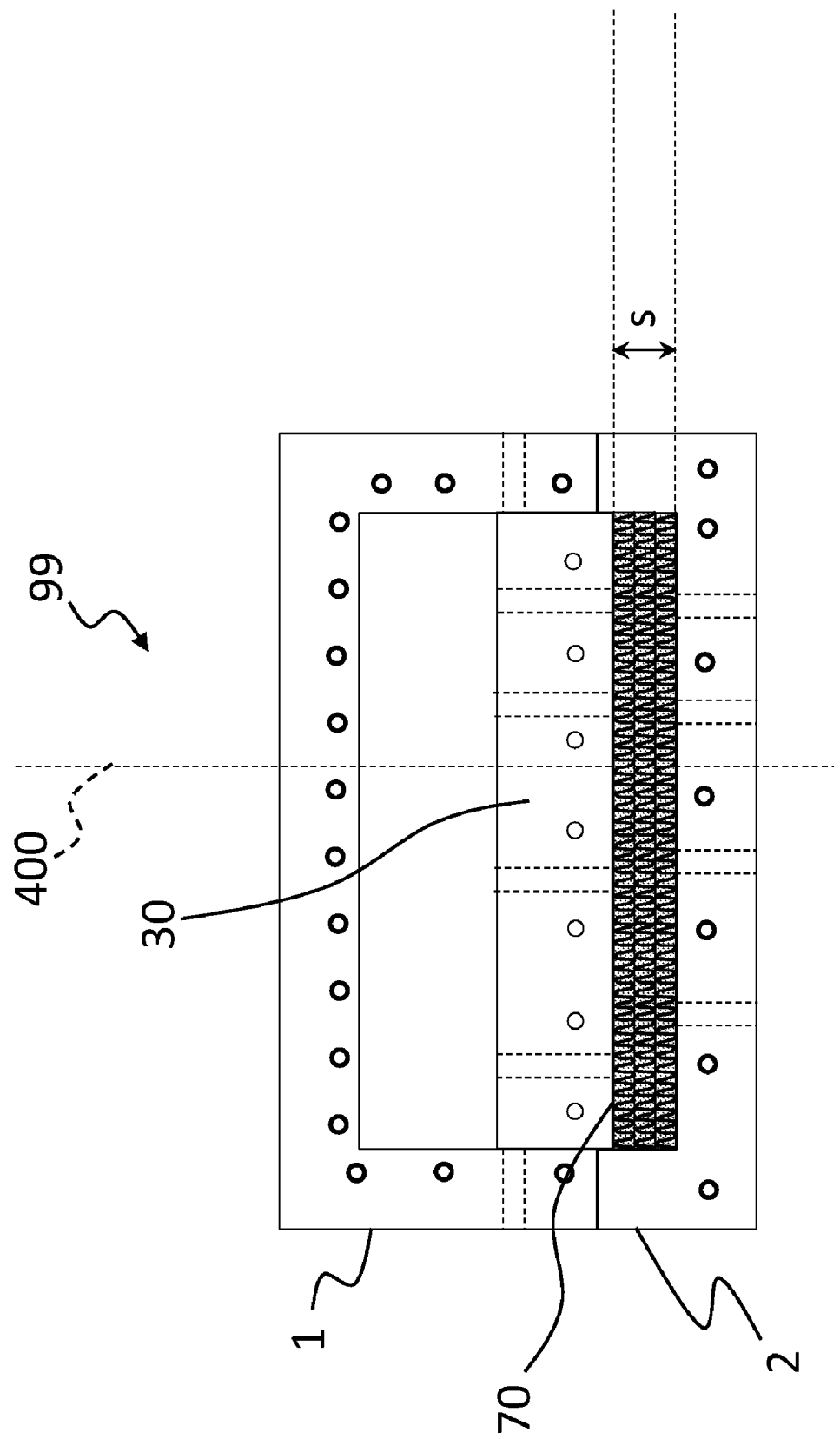
Figure 2D:
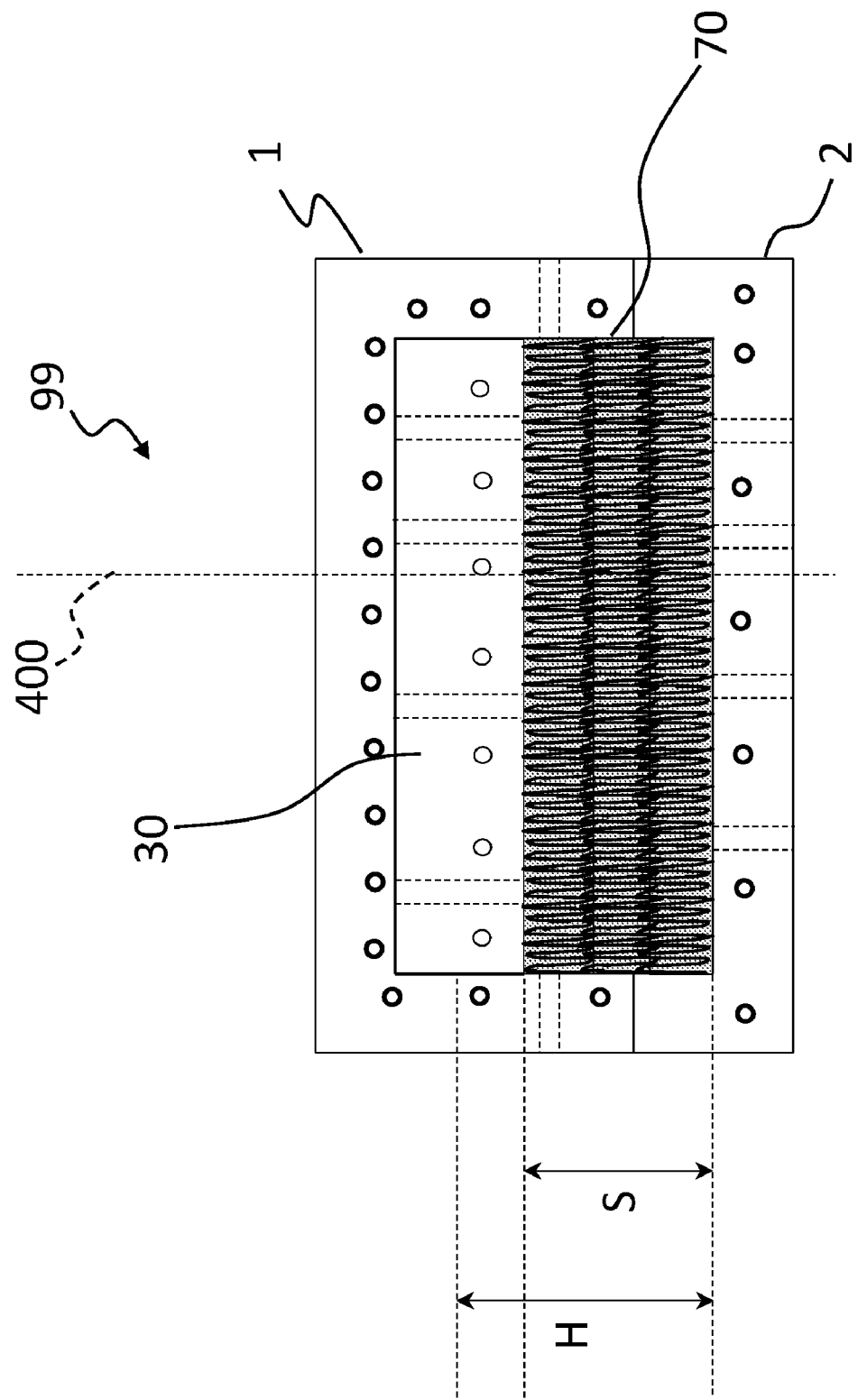
Figure 3A:
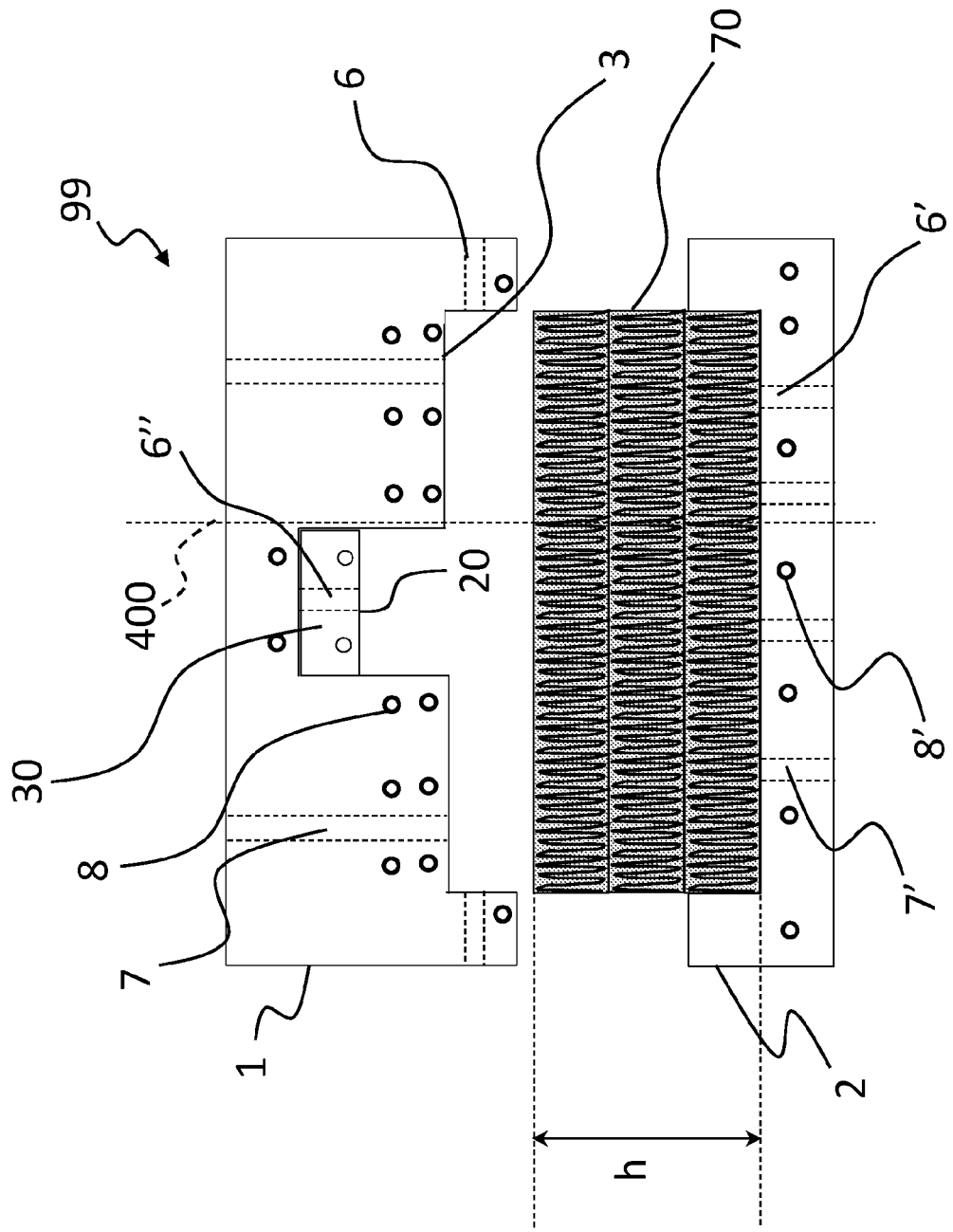
FIGS. 3a-e schematically show some steps of a process for moulding carried out with a machine for moulding according to a further embodiment of the present invention.
Figure 3B:
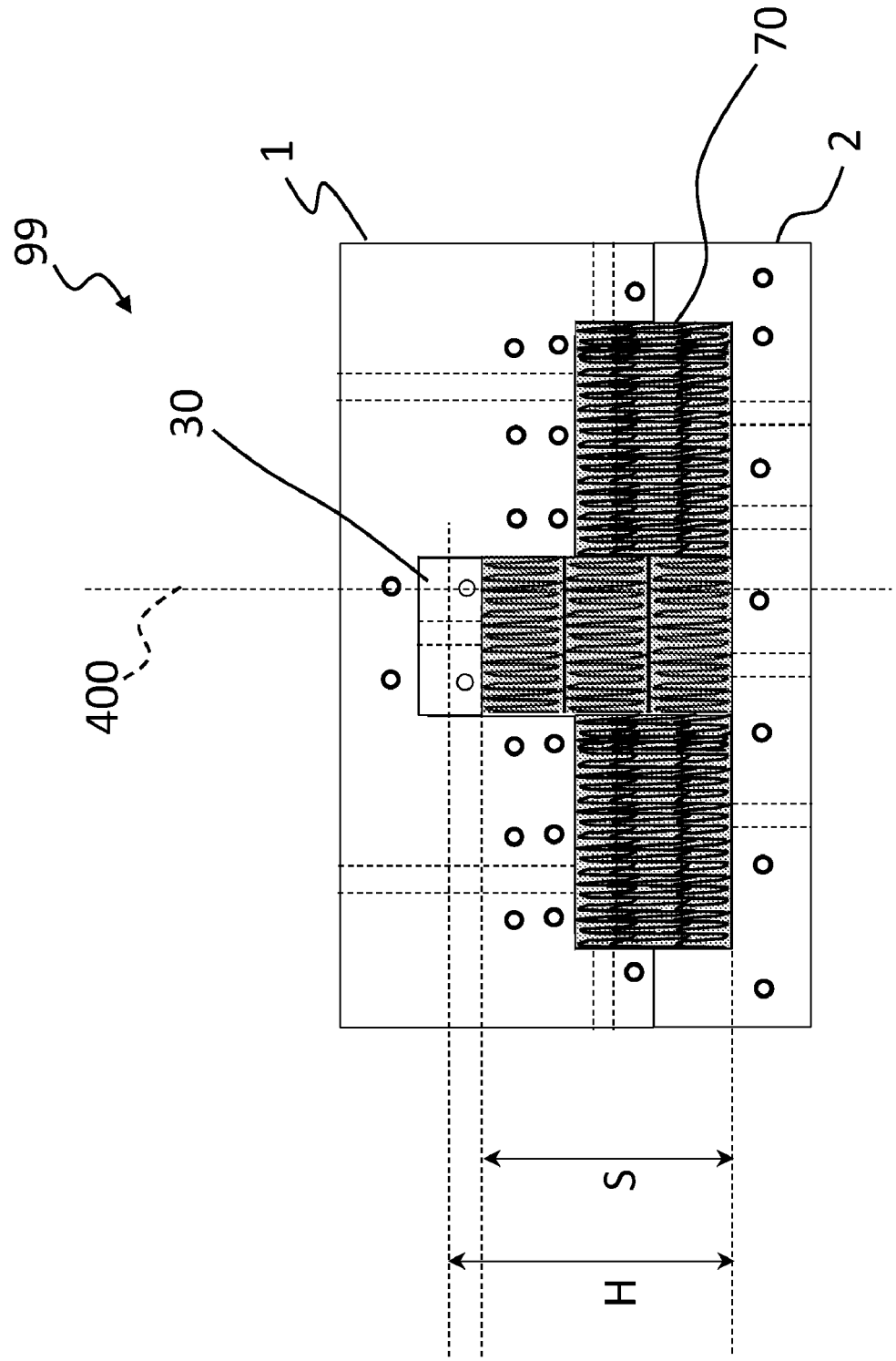
Figure 3C:
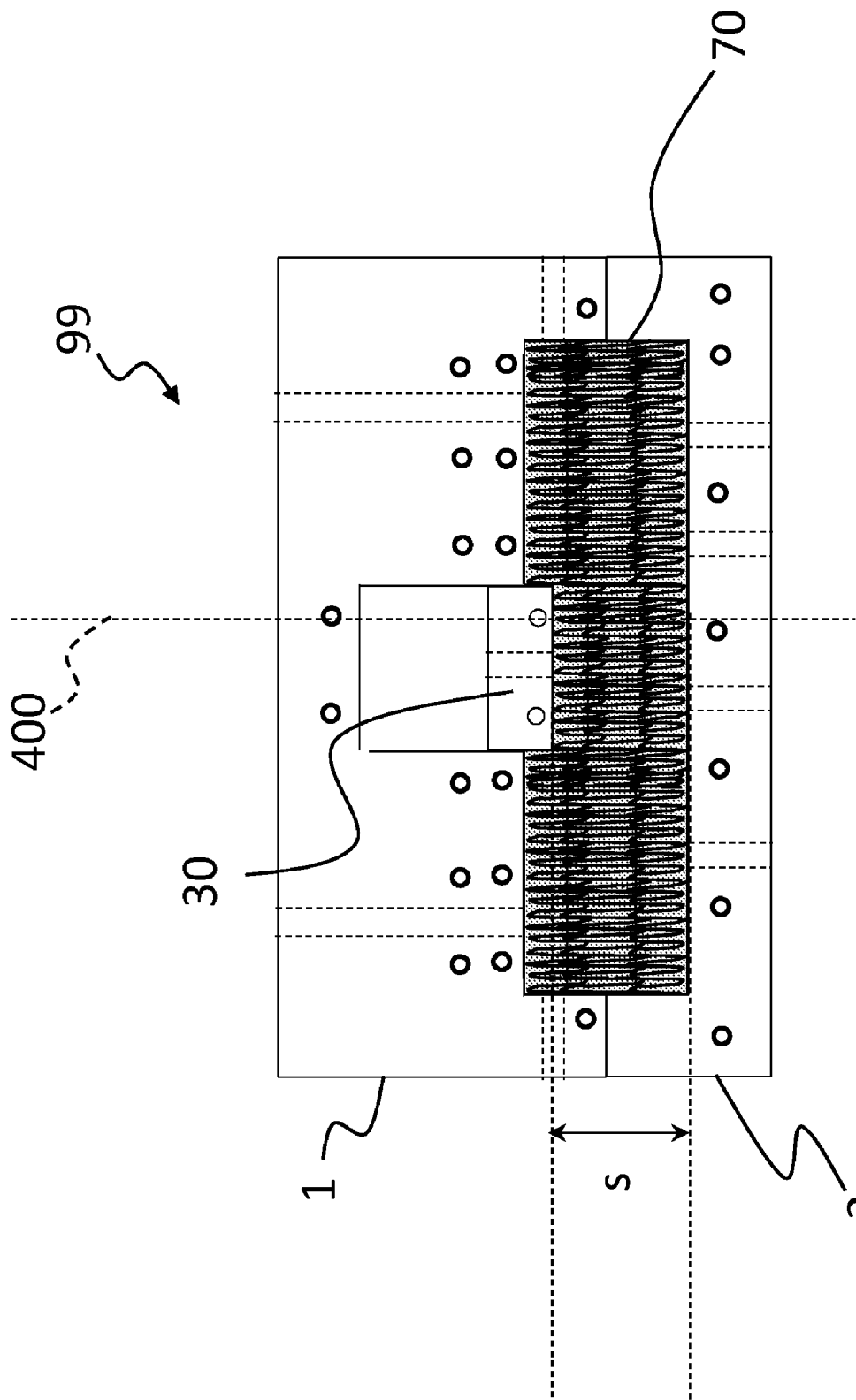
Figure 3D:
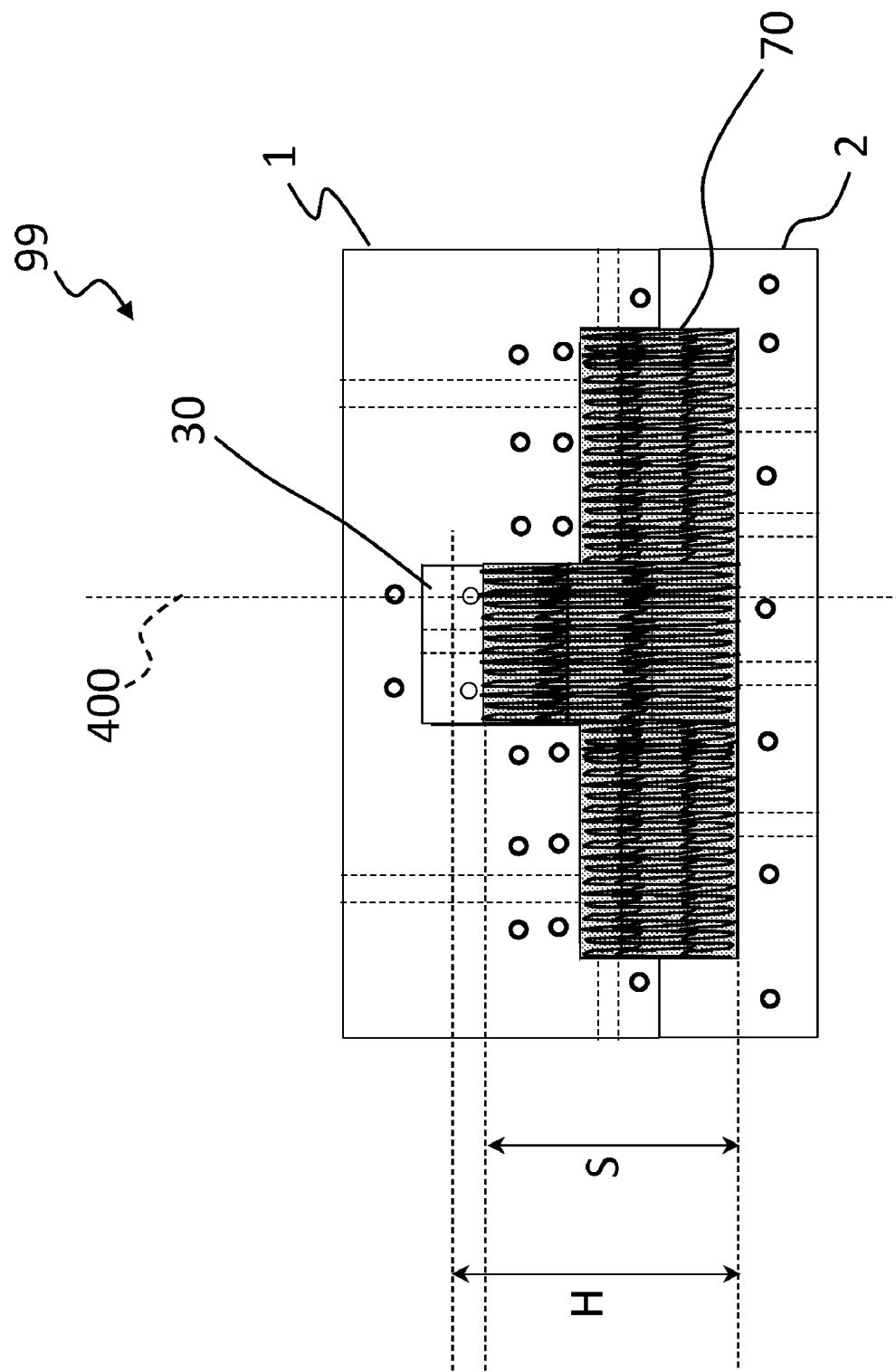

The distance s of the surface portion 20 from the conformation surface 4 of the second half-mould is exemplarily shown in FIG. 2*c* less than the thickness h of the laminated semi-finished product, although it can alternatively be greater than h.

With the cavity 5 in the compacting configuration and the heating fluid into the cavity 5, the semi-finished product 70 is compressed between the conformation surfaces 3, 4. In the case of a laminated semi-finished product (FIGS. 2*a*-*e*), the compression of the semi-finished product 70 also takes place due to an expansion of the laminated semi-finished product along the vertical direction. In fact, in addition to the compression action exerted by the surface portion 20 on the semi-finished product which tends to bring the layers of the semi-finished product closer together, there is also a force, which tends to bring the layers closer together, acting along the vertical direction and generated by the expansion of the semi-finished product. The heating leads the semi-finished product to try recovering its initial or natural thickness, due to the release of the mechanical stresses induced in the semi-finished product during the lamination process. The expansion generates a force that compresses the semi-finished product as the cavity is in the compacting configuration having a thickness less than the natural thickness to which the semi-finished product tends to return.

Subsequently, while keeping the heating fluid in the cavity 5, the cavity 5 is arranged in the conformation configuration (FIGS. 2*d* and 3*d*) in which the surface portion 20 is moved into the conformation position, so that the semi-finished product elastically expands to completely occupy the cavity 5 and it assumes the final shape.

Exemplarily the surface portion 20, when the cavity 5 is in the conformation configuration (FIGS. 2*d* and 3*d*), has a distance S from the conformation surface 4 of the second half-mould 2 equal to about 80% of the natural thickness H of the semi-finished product 70.

For example, the semi-finished product 70 consists of three layers each having a thickness, when the layer is not laminated, equal to 50 mm.

In the embodiment shown in FIGS. 2*a*-*e*, in which the semi-finished product is laminated, the overall thickness h of the semi-finished product is equal to about 30 mm (thickness of each single layer post-lamination equal to about 10 mm), while in the embodiment shown in the FIGS. 3*a*-*e*, in which the semi-finished product is not laminated, the overall thickness h of the semi-finished product, equal to the sum of the thicknesses of each layer, is equal to about 150 mm.

Exemplarily, the natural thickness H of the semi-finished product is equal to about 150 mm in the embodiment shown in FIGS. 3*a*-*e*, while it is equal to about 140 mm in the embodiment shown in FIGS. 2*a*-*e*.

In the embodiment shown in FIGS. 2*a*-*e*, when the cavity is in the compacting configuration (FIG. 2*c*) the distance s of the surface portion 20 from the conformation surface 4 of the second half-mould 2 is exemplarily equal to about 20 mm whereas when the cavity is in the conformation configuration (FIG. 2*d*) this distance S is equal to about 120 mm. Therefore, this distance s in the compacting configuration is equal to about 15% of the distance S in the conformation configuration.

In the embodiment shown in FIGS. 3*a*-*e*, when the cavity is in the compacting configuration (FIG. 3*c*) the distance s of the surface portion from the conformation surface of the second half-mould is equal to about 50 mm, whereas when the cavity is in the conformation configuration (FIG. 3*d*) the distance S is equal to about 120 mm. Therefore, this distance s in the compacting configuration is equal to about 40% of the distance S in the conformation configuration.

Exemplarily the saturated steam is kept in the cavity 5 for an overall time interval equal to about 10 s, including the compression step and the conformation step.

Subsequently, the saturated steam is evacuated from the cavity 5, exemplarily through the outlet conduits 7, 7' which connect the cavity 5 with the environment outside the mould 99, for cooling the semi-finished product 70 and obtaining the finished article with the shape equal to that of the cavity 5 in the conformation configuration. Exemplarily the heating fluid (e.g., saturated steam) is evacuated in a time interval equal to about 5 s.

Figure 2E:
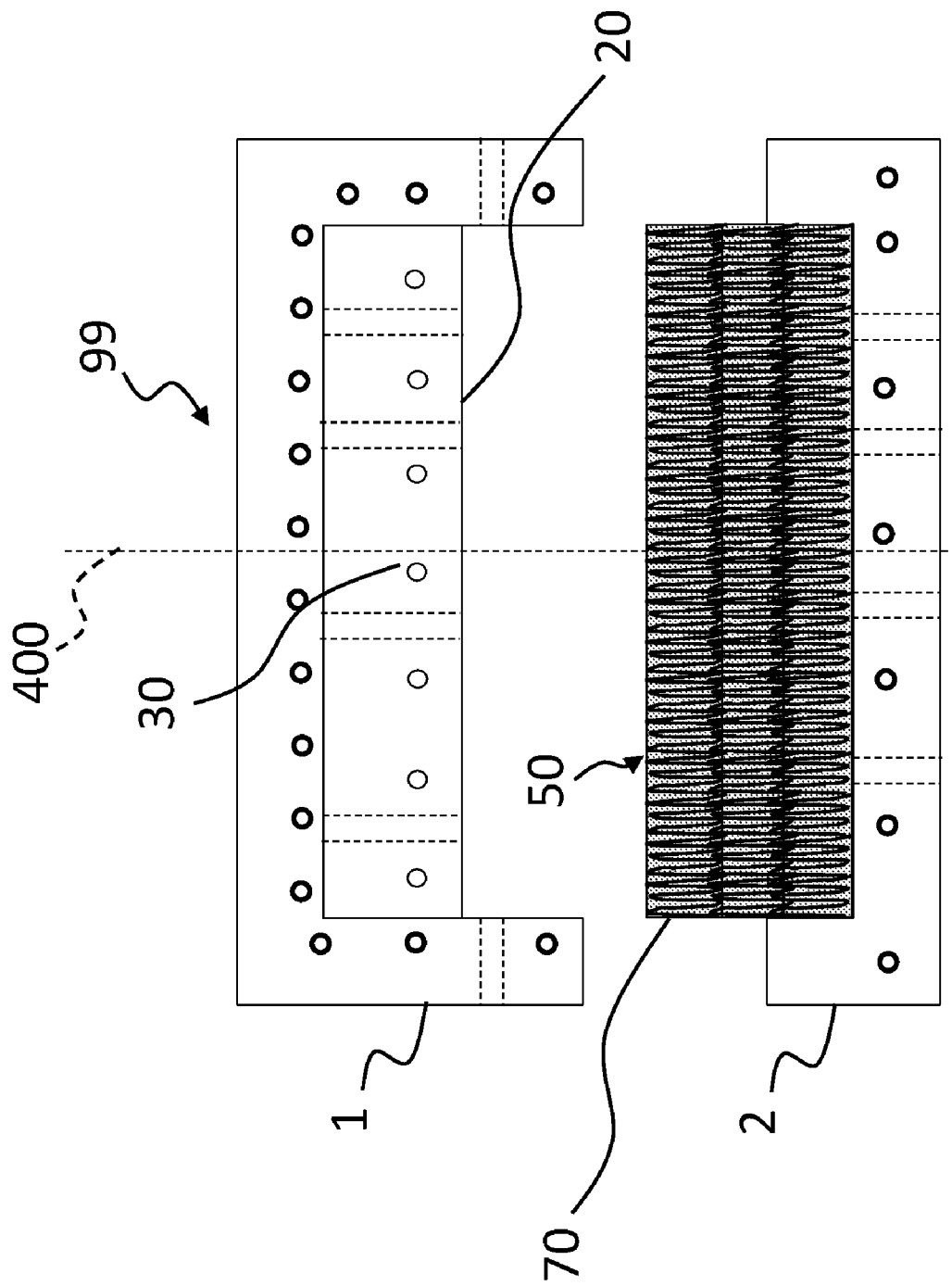
Figure 3E:
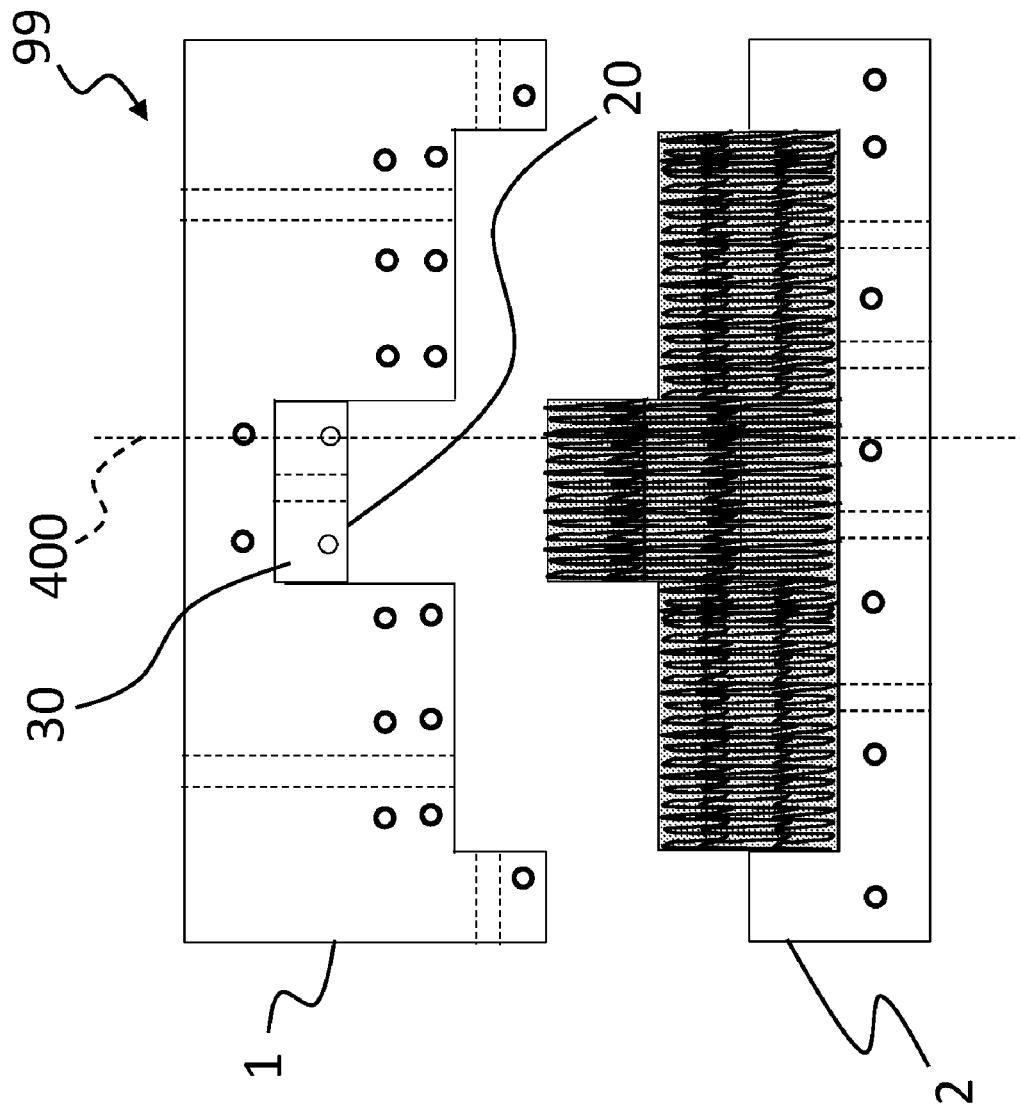

At this point the mould 99 is opened for extracting the finished article (FIGS. 2e and 3e).

In not shown embodiments the semi-finished product can have cells, e.g., it is a solid and elastic foam made before moulding, or a liquid foam directly injected into the cavity 5.

What is claimed is:

1. A process for moulding a thermoplastic material for producing a finished article having a shape, wherein the process comprises:
    providing a mould comprising a first and a second half-mould each having a respective conformation surface which define, with closed mould, a cavity having, in a conformation configuration, the shape of the finished article;
    making a semi-finished product made of the thermoplastic material and permeable to a heating fluid;
    closing the mould with the semi-finished product interposed between the conformation surfaces;
    admitting the heating fluid into the cavity for heating the semi-finished product;
    arranging the cavity in a compacting configuration, wherein the cavity in the compacting configuration is smaller than the cavity in the conformation configuration, for compressing the semi-finished product between the conformation surfaces with the heating fluid in the cavity;
    subsequently, arranging the cavity in the conformation configuration while keeping the heating fluid into the cavity, wherein the semi-finished product elastically expands for completely occupying the cavity in the conformation configuration and assuming the shape of the finished article;
    subsequently, evacuating the heating fluid from the cavity for cooling the semi-finished product for obtaining the finished article with the shape;
    opening the mould and extracting the finished article from the mould.

2. The process according to claim 1, wherein the conformation surface of the first half-mould comprises at least one surface portion movable between a conformation position and a compacting position in which the, surface portion is closer to the conformation surface of the second half-mould with respect to the conformation position, wherein arranging the cavity in the compacting configuration comprises positioning the at least one surface portion in the compacting position, wherein arranging the cavity in the conformation configuration comprises moving the at least one surface portion from the compacting position to the conformation position, wherein the at least one surface portion, when the cavity is in the conformation configuration, has a distance from the conformation surface of the second half-mould greater than or equal to 50% of a natural thickness of the semi-finished product, and wherein the at least one surface portion, when the cavity is in the compacting configuration, has a distance from the conformation surface of the second half-mould less than or equal to 50% of a distance of the at least one surface portion from the conformation surface of the second half-mould when the cavity is in the conformation configuration.

3. The process according to claim 1, wherein the heating fluid is saturated steam, wherein the heating fluid is admitted at a temperature greater than or equal to 100° C. and less than or equal to 300° C., wherein the heating fluid is admitted at a pressure greater than or equal to 1 bar and less than or equal to 20 bar, wherein the heating fluid is kept into the cavity for an overall time interval greater than or equal to 2 s and less than or equal to 90 s, wherein the process further comprises, before the closing the mould, heating the first and second half-mould at a temperature greater than or equal to 100° C. and less than or equal to 340° C., and wherein the semi-finished product comprises a plurality of layers distinct to each other and superimposed along a closing direction of the mould and wherein heating the first and second half-mould comprises heating the conformation surfaces to a temperature greater than or equal to the temperature at which the saturated steam is admitted into the cavity.

4. The process according to claim 1, wherein the thermoplastic material is selected from the group consisting of polyester, polyurethane, polyethylene, polypropylene and polyamide, wherein the semi-finished product comprises a vertically lapped non-woven fabric, wherein the semi-finished product comprises a sheet of fibres having a plurality of laps oriented so that each lap develops from the conformation surface of the first half mould to the conformation surface of the second half-mould, and wherein the fibres of the sheet are mainly oriented concordantly to a development of the laps from the conformation surface of the first half-mould to the conformation surface of the second half-mould.

5. The process according to claim 1, wherein making the semi-finished product comprises:
    spreading a sheet made of thermoplastic structural fibres and polymeric bonding fibres;
    processing the sheet so as to mainly orient at least the structural fibres with respective main development directions substantially parallel to each other and parallel to a development line of the sheet;
    repeatedly and alternately folding the sheet of fibres moving along the development line of the sheet so as to obtain a plurality of laps with continuous trend of peaks and valleys;
    subsequently to the folding, heating the fibres for melting the bonding fibres and thermally bonding the fibres; and
    subsequently, cooling the fibres for obtaining the semi-finished product.

6. The process according to claim 1, wherein the thermoplastic material is selected from the group consisting of polyester, polyurethane, polyethylene, polypropylene and polyamide, wherein the semi-finished product comprises a non-woven fabric comprising needle-punching fibres, and wherein making the non-woven fabric comprises:
    spreading superimposed to each other one or more layers of fibres of thermoplastic material; and
    perforating the one or more layers of fibres along a thickness for entangling the fibres of thermoplastic material.

7. The process according to claim 1, wherein the semi-finished product is laminated, wherein making the laminated semi-finished product comprises:
    spreading superimposed to each other one or more precursor layers, each layer having an initial thickness along a vertical direction;
    heating the one or more precursor layers to a temperature greater than or equal to a melting temperature of the thermoplastic material; and
    compressing along the vertical direction and cooling the one or more precursor layers for obtaining the semifinished product in which each layer has a thickness less than the initial thickness, wherein the laminated semi-finished product is interposed between the conformation surfaces with the vertical direction parallel to a closing direction of the mould, and wherein compressing the laminated semi-finished product between the conformation surfaces occurs due to an expansion of the laminated semi-finished product along the vertical direction.

\* \* \* \* \*